Dec. 18, 1956 L. M. KAHN Re. 24,257

COMBINED WASHING AND SQUEEZE DRYING MACHINE

Original Filed July 28, 1945 2 Sheets-Sheet 1

INVENTOR
Leo M. Kahn
BY S. Stephen Baker

Dec. 18, 1956 L. M. KAHN Re. 24,257
COMBINED WASHING AND SQUEEZE DRYING MACHINE
Original Filed July 28, 1945 2 Sheets-Sheet 2
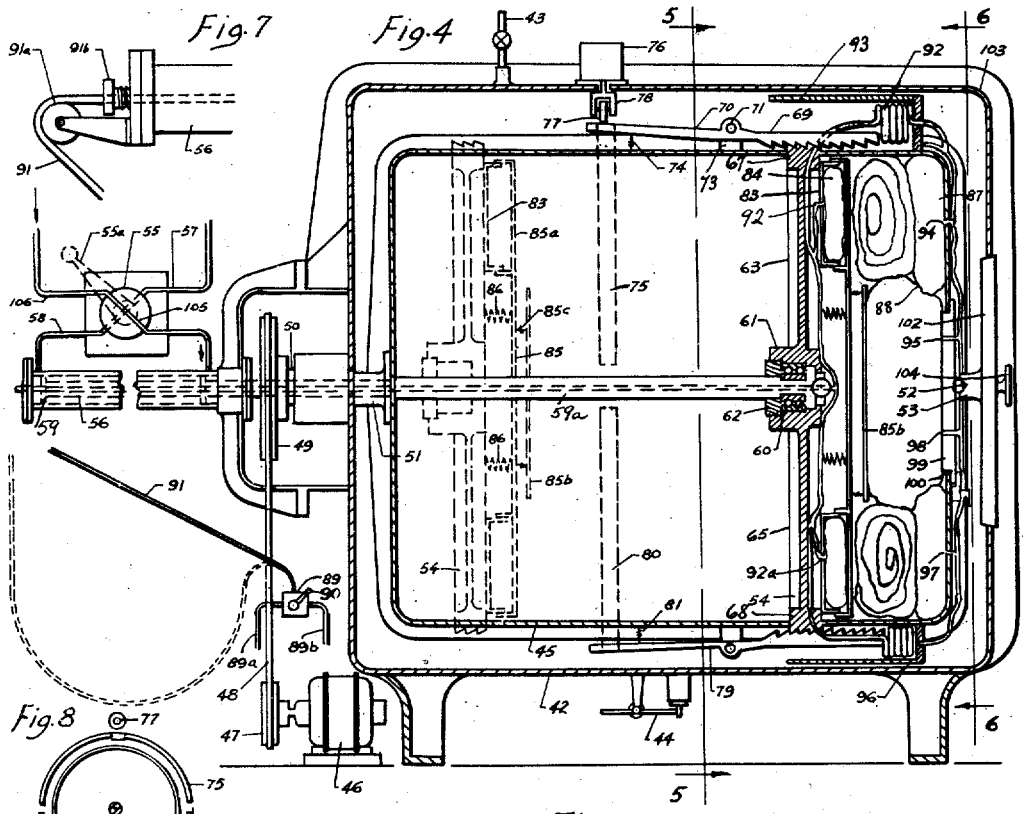
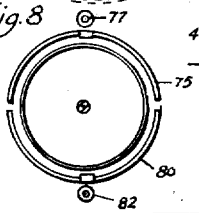
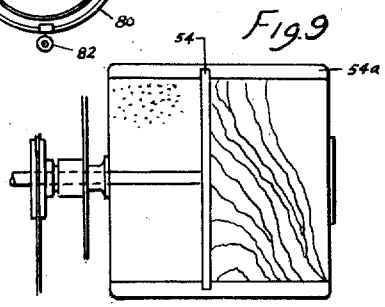
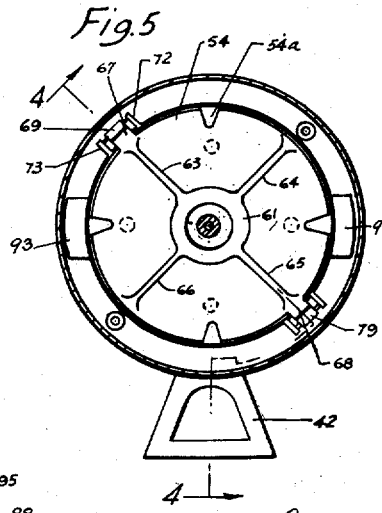
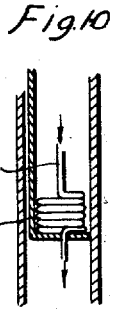
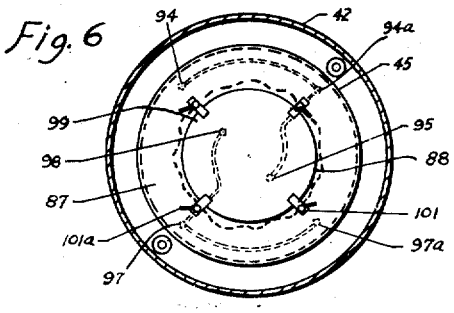
INVENTOR
Leo M. Kahn
BY S. Stephen Baker
ATTORNEY United States Patent Office Re. 24,257
Reissued Dec. 18, 1956

24,257

COMBINED WASHING AND SQUEEZE DRYING MACHINE

Leo M. Kahn, Island Park, N. Y.

Original No. 2,611,257, dated September 23, 1952, Serial No. 607,587, July 28, 1945. Application for reissue September 6, 1956, Serial No. 608,415

15 Claims. (Cl. 68—21)

Matter enclosed in heavy brackets [ ] appears in the original patent but forms no part of this reissue specification; matter printed in italics indicates the additions made by reissue.

This invention relates to washing machines and more particularly to washing machines incorporating means to extract the wash water from the washed clothes without removing them from the washing drum.

One of the objects of this invention is to provide a novel and efficient apparatus designed to extract the wash water from the clothes by applying opposing forces on both sides of a washed mass of clothes so as to squeeze the water therefrom.

Another object of this invention is to apply squeezing forces to a mass of wet articles by utilizing an expandible, pressure-transmitting element, wherein a minimum of strain is imposed on the expandible element while very high pressures are exerted thereby on the articles.

Another object of this invention is to guide the washed articles in the washing cylinder so as to concentrate them where they may be effectively acted upon by the above-mentioned pressure element.

A further object of this invention is to produce a squeezing force which will not diminish with the progress of the squeezing operations. It will be appreciated that squeezing of mass of wet clothes to press the wash water therefrom necessarily reduces the volume of the mass. If this reduction of volumes is not accompanied by a compensating change in the squeezing elements, unsatisfactory action often ensues due to either a reduction of squeezing force as the squeezing element is extended to the new position required by the reduced volume of the mass, or the subjection of the squeezing element to great physical strain as the distance over which it must operate is increased.

Other objects of my invention will be apparent from the following description, it being understood that the above general statements of the objects of my invention are intended to describe and not to limit it in any manner.

Referring to the drawings:

Fig. 4 is a vertical section through a modified embodiment of the invention along the line 4—4 of Fig. 5.

Fig. 5 is a section on the line 5—5 of Fig. 4 on a reduced scale.

Fig. 6 is a section on the line 6—6 of Fig. 4 on a reduced scale and with parts omitted.

Fig. 7 is a fragmentary view of the squeezing element hydraulic pressure input cable assembly.

Fig. 8 is a more or less schematic view illustrating the pressure disk release mechanism.

Fig. 9 is a sectional view illustrating the movement of the pressure disk prior to the application of squeezing pressure.

Fig. 10 is a fragmentary view of the hydraulic cable supporting means.

Figure 1:
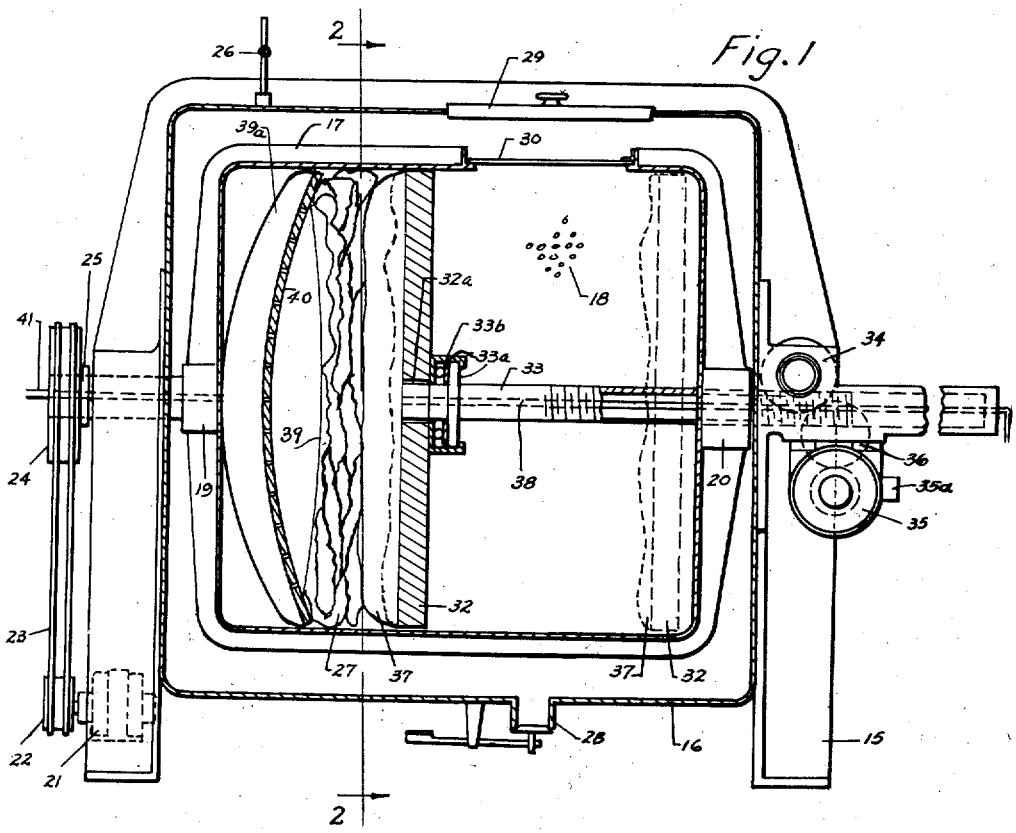
Fig. 1 is a vertical section through a preferred embodiment of the apparatus.
Figure 2:
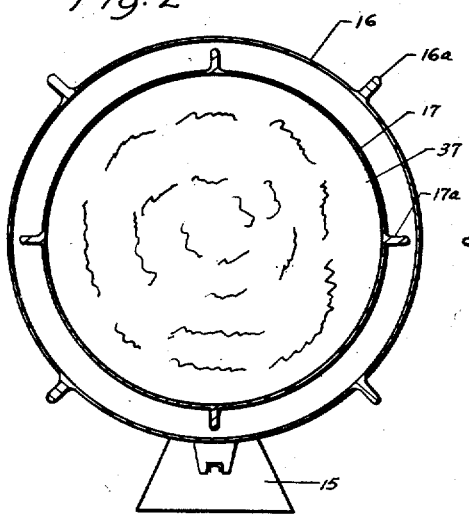
Fig. 2 is a section along the line 2—2 of Fig. 1, partly broken away.
Figure 3:
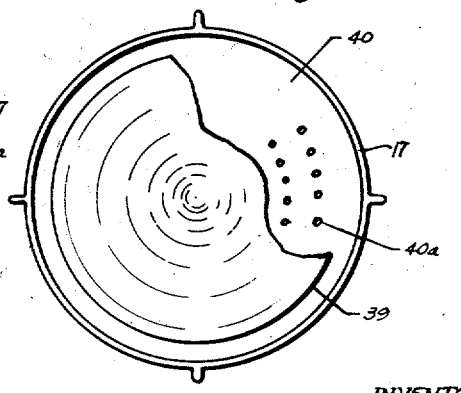
Fig. 3 is an elevational view illustrating one of the pressure elements as disposed in the washing drum and partly broken away.

The machine illustrated in Figs. 1–3 includes a suitable frame 15 supporting a stationary fluid-tight housing or shell 16 adapted to contain wash water, rinse water or other cleaning materials. Strengthening ribs 16a are disposed on the outer surface of the housing 16. Rotatably supported within the housing 16 is the drum 17 having the usual perforations 18, the drum 17 being arranged with its axis horizontal and having trunnions 19 and 20 at its end walls by means of which it is rotatably supported by the housing 16. Strengthening ribs 17a are disposed on the outer surface of the drum 17.

Rotating motion is imparted to the drum 17 by the motor 21 through its pulley 22, the belts 23, the pulley 24 and the shaft 25 which is frictionally or otherwise connected to the drum trunnion 19.

A wash water input valve 26 serves to introduce wash water into the shell 16, the water reaching the mass of clothes 27 through the perforations 18 in the drum 17. A dump valve 28 serves to drain water from the shell 16 as well as from the drum 17 since the water therein will drain to the shell 16 through the perforations 18.

A door 29 in the shell 16 registers with a door 30 in the drum 17 so that soap, clothing, or any other required articles may be loaded into the drum 17.

Washing of the clothes is effected by rotating the drum, as is conventional, by the action of the motor 21. The inner periphery of the drum 17 is provided with ribs, not shown, extending parallel to the axis of rotation for the usual agitating or washing action.

Means are provided to squeeze the wash water from the clothes when the washing or rinsing operations are completed. For this purpose a disk 32 is arranged for axial movement in the drum 17. The disk 32, which may be of metal, wood, or the like, is connected to a worm shaft 33 and is driven by a spur gear 34 which is actuated by electric motor 35 through reduction gearing 36. Electric motor 35 is of the reversible type so that energization thereof will serve to drive the disk 32 axially of the drum 17 in either direction at the will of the operator. Transmission of rotating motion between the disk 32 and shaft 33 is prevented by an anti-friction bearing 33a disposed in the hub 33b of disk 32.

Secured to the disk 32 as by a multiplicity of radially disposed threaded bolts, not shown, is the flexible bag 37. The bag 37 is preferably, but not necessarily, of a flexible, water-proof material such as canvas although it may be of an elastic material such as rubber. Due to the operation of the present apparatus, it is unnecessary to inflate the bag 37 to such an extent that the material of which it is constructed is forced to stretch. An important element of the present invention, therefore, is that the bag 37 may be of non-stretchable material as will hereinafter appear. Fig. 1 illustrates in dotted lines the shape of the bag when in the inoperative position.

As will be observed hereinafter, the disk 32 is arranged to travel axially of the cylinder while the cylinder is rotating so that the wet clothes are both compressed and urged into radial form prior to the inflation of bag 37. This achieves a concentration of the clothes in flattened form and facilitates the application of high pressures thereto.

Means to inflate the bag by a fluid under pressure is provided. The shaft 33 is provided with an internal pipe 38 through which such fluid may be introduced. Thus, a conduit not shown communicating with the pipe 38 at the outer end of shaft 33 through a conventional type stuffing box, not shown, may serve to introduce water or any other fluid under pressure to the bag 37, filling up the bag and creating considerable pressure along its surface. The water pressure may be about 30 lbs. per square inch and it may be taken from the community water supply or, a pump may be provided should the community water supply furnish insufficient pressure.

Means for applying an opposing squeezing force is provided. Such means takes the form of a flexible bag 39 which is supported by the concave steel plate 40 by means of radially disposed bolts, not shown, or by similar means.

Firmly retained in a set position by the inner wall of the drum 17 is the concave steel plate 40, which is retained against said inner wall of the drum 17 by frictional means or by a concave member 39a. Concave member 39a of steel or the like, is supported by the end wall of the drum 17 adjacent to trunnion 19 and its rim is connected as by welding to the rim of steel plate 40. The steel plate 40 is formed with perforations 40a to permit fluid under pressure to inflate the bag 39 and exert hydraulic pressure against its inner walls. Fluid for this purpose may be introduced through a pipe 41, through the pulley 24 and trunnion 19, into the bag 39. The fluid under pressure may originate from the same source and be controlled by the same means as the fluid for the bag 37.

The apparatus as illustrated in Figs. 1–3, is operated as follows:

Clothes or other material to be cleaned are placed in the drum 17 through the doors 29 and 30 and water controlled by valve 26 is introduced into the shell 16 entering the drum 17 through the perforations 18. When the water reaches the proper level for washing in the shell 16, it is shut off and sufficient soap and any other cleaning material is supplied. Thereafter, the single speed washing motor 21 is energized through conventional control means. At the conclusion of the washing operation, the dirty wash water is permitted to drain off through the dump valve 28. One or more rinsing operations may follow.

Then, while the drum 17 is rotating at a slow or washing speed as driven by the motor 21, motor 35 is started so as to effect the inward movement of disk 32. Since the clothes are being tumbled about by the washing ribs while the disk 32 is moved inwardly and is accordingly exerting a lateral pressure against them, the clothes will tend to distribute themselves radially instead of settling at the bottom of the drum. Thus, the clothes will tend to assume the pancake shape illustrated in Fig. 1. As the disk 32 and bag 37 travel inwardly they will meet considerable resistance as the clothes become concentrated and the load on the motor 35 will increase. A thermal overload relay 35a of conventional design will thereupon open the electrical circuit of the motor. When the disk 32 and bag 37 stop their axial movement due to the action of the thermal overload relay fluid under pressure may be introduced through the pipes 38 and 41, simultaneously if desired, and from a common source. Bags 37 and 39 will inflate but since the motor 35 has caused the bags and clothes to be in juxtaposition, the necessary inflation of the bags will be extremely limited. It will be appreciated that the action of the motor 35 has, in effect, initiated the squeezing action so that the hydraulic pressure apparatus need operate only over a very short distance. Thus, the bags 37 and 39 need never be inflated to a degree where the material thereof must stretch in response to the pressure. Accordingly, rubber, or any other elastic material need not be employed and in any event, the material of the bags will not be subjected to great strain from the pressure of the hydraulic power.

It will also be observed that as the bags 37 and 39 squeeze the clothes, the volume of the clothes is necessarily reduced. This will reduce the load on the motor 35 so as to restore it to operation as the thermal overload relay loses control. Thus, the slack due to the decreased volume of the clothes will be taken up by the motor 35. During the progress of the squeezing operation the application of the fluid pressure should be intermittent so as to allow the motor 35 to operate as the clothes are reduced in volume. This may be easily accomplished by manual actuation of a valve controlling the fluid pressure such as described in the following embodiment of the invention. Similarly, instead of a thermal overload relay, manually controlled stop means may be provided in combination with a transparent window for providing visual access to the interior of the drum such as is shown in my co-pending application Serial No. 597,897, filed June 6, 1945, now Patent No. 2,540,168.

In the embodiment shown in Figs. 4–10, the apparatus comprises a shell or housing 42 having the usual water input valve 43 and dump valve 44. A perforated drum 45 is rotated by the two speed electric motor 46 through pulley 47, belt 48, pulley 49 and shaft 50 which is connected to the trunnion 51 of the drum 45. The other end of the drum has a ball projection 52 which is rotatably retained by the bronze or other type of anti-friction bearing 53.

After the articles are washed as described above, extensible or inflatable bags are utilized for expressing the water from the wet articles. A disk 54 having cut-outs formed therein to accommodate the ribs 54a is arranged for axial movement in the drum 45. In order to accomplish this axial movement a two way valve 55 is provided to supply fluid under pressure to the hydraulic cylinder 56. When the valve handle 55a is pushed to the right, viewing the apparatus as in Fig. 4, ports 57 and 58 are brought into communication and the piston 59 in the hydraulic cylinder 56 is inwardly actuated by the fluid under pressure. Piston 59 is connected to disk 54 through piston rod 59a so that the inward movement of the piston is transmitted to the disk 54. In order to avoid rotation of the piston rod 59a, it is connected to anti-friction bearing 60 retained in hub 61 of the disk 54, a nut 62 serving to enclose the bearing member.

Disk 54 is formed with radial ribs 63, 64, 65 and 66. Radial ribs 63 and 65 are provided at their outer ends with teeth 67 and 68 which extend through the drum 45 and travel in slots formed therein. Fig. 4 illustrates in broken lines the disk 54 when in inoperative position.

Means are provided to lock the disk 54 against outward axial movement during the squeezing operations. For this purpose, a toothed detent 69 is arranged to engage the teeth 67. It will be observed that the respective teeth of the disk 54 and detent 69 are biased to permit free inward movement of the disk 54 but outward movement thereof is resisted when the teeth are engaged.

Toothed detent 69 comprises an arm 70 pivoted on the pivot pin 71 supported in bearings 72 and 73. A spring 74 one terminal of which is connected to the drum 45 is arranged to bear upwardly against the arm 70 so as to maintain the detent 69 in normally locked relationship.

Means are provided to effect release of the teeth 67 from the detent 69 so as to permit retraction of the disk 54. Such means take the form of a ring 75 connected to the arm 70 of detent 69. A solenoid 76, having a plunger in the form of a roller 77, is arranged to expel the roller 77, when energized. Such a solenoid is well known to the art, energization thereof producing like poles in the solenoid housing and plunger thereby effecting a repulsion of the plunger. Roller 77 is slidably mounted on a pair of arms 78 limiting the outward throw of the roller. Release of the teeth 67 from the detent 69 is effected when the solenoid 76 is energized so as to cause roller 77 to bear against ring 75 against the action of spring 74. This pivots detent 69 upwardly and disengages the teeth.

Located 180 degrees away on the periphery of drum 45 is a structure which duplicates exactly the locking and releasing structure above mentioned. Thus, a detent arm 79 is arranged to engage teeth 68 of opposing rib 65. Similarly, a ring 80 in cooperation with spring 81, roller 82 and a solenoid, not shown, effects the release of detent arm 79.

Inflatable or flexible bags are provided in order to squeeze and express the washing water from the washed articles. Accordingly, a circular channel 83 of U-shaped cross section is secured as by bolts, not shown, to the face of disk 54. A circular bag 84, of annular form is retained in the channel 83. The bag 84, like the bags 37 and 39 of the previous embodiment, may be of canvas, rubber, rubberized cloth, etc. A plate 85 having a U-shaped circular channel 85a formed thereon which is complementary in shape to that of channel 83, is secured by four springs 86 to the disk 54 so as to be resiliently connected thereto. Channels 83 and 85 serve to house the bag 84. A plate 85b has springs 85c connected thereto for maintaining the plate 85b normally outwardly of the plate 85.

The washed mass is designed to be squeezed between inflatable bags acting in opposition to the bag 84 so as to achieve a high degree of water extraction. For this purpose, a bag 87 of annular form is retained against the front inner wall of the drum 45. Similarly, a bag 88 is disposed centrally of the annular bag 87 and is of greater depth as illustrated so that it extends considerably beyond the bag 87. Its pressure, however, is designed to be considerably less than that of bag 84 so that it does not neutralize the pressure. This is accomplished by having its pressure area small in relation to the pressure area of bag 87 although the bag 88 may be dispensed with as not essential to the operation of the device.

The introduction of fluid under pressure to the bags is effected through the manually operated two way valve 89, having a valve handle 90. The construction of the valve handle 90 is similar to that of valve 55 the handle 90 controlling a duct which connects hose 91 to either of conduits 89a or 89b, conduit 89a communicating with the pressure supply. Fluid, such as water under pressure may be taken from the community supply or may be provided by a special pump. The hose 91 is led over pulley 91a, through the stuffing box 91b, of conventional design, into the hydraulic cylinder 56. It travels through the piston 59, shaft 59a, through the bearing 60, after which it branches off between the ribs formed on the outer face of the disk 54.

Hose 91 supplies the fluid to bag 84 through channel 83 at openings 92 and 92a and thereafter branches off to a slack section which is shown in helical form at 92. The section of hose 91 illustrated as being coiled at 92 may be provided with a coiled spiral enveloping spring, not shown, which urges said section into its helical form. This spiral spring may be of the type commonly used on home telephone wire to avoid tangling thereof. A shelf 93 is provided on drum 45 to support said helical section of hose 91.

Hose 91 is led through an opening in shelf 93 where it is introduced into bag 87 at point 94 and into bag 88 at point 95. The opposite side of the drum 45 is likewise provided with a branch off of hose 91, a section of the hose being coiled on the shelf 96 and the hose then being introduced into the bag 87 at point 97. Exhaust of the pressure fluid is provided at points 94a, 97a and 98 respectively. Bag 88 is supported on a disk 99 by rivets, not shown, or other suitable means. Disk 99 is provided with a shoulder 100 which nests against the end wall of drum 45 said end wall being formed with a central opening for admitting the disk 99. Pivoted latches 101, serving to frictionally retain the disk 99 against the central opening of the drum 45, are provided in said end wall and are manually operated by handles 101a. Disk 99 has formed thereon the ball 52 which is supported in the bearing 53 of the door 102 which is in turn hingedly supported in the end wall 103 of the shell 42 and which is provided with a handle 104. A supplementary hinged door, not shown is formed on door 102 to provide access to the latches 101, the supplementary door being similar to the door shown in my co-pending application Serial No. 569,609, filed December 23, 1944.

After the mass of clothes has been squeezed to express the water therefrom as will be hereinafter described, the disk 54 is retracted to prepare the apparatus for the next load of clothes. At that time valve 55 is operated to bring ports 105 and 106 into communication. This serves to introduce fluid under pressure to the right side of piston 59 as viewed in Fig. 4, so as to force the piston outwardly and effect the retraction of the disk 54. The total extent of retraction need only be approximately 12 inches or even less in a machine designed to operate upon a limited quantity of clothes. The retraction will, of course, uncoil the hose 91 where it is supported on the shelves 93 and 96.

The apparatus shown in Figures 4–9 is operated as follows:

With the disk 54 in the retracted position shown in dotted lines in Fig. 4, the supplementary door on door 102 is swung open and the handles 101a are turned to release the latches 101 from the disk 99. Then handle 104 is actuated to swing the door 102 outwardly. This action brings the disk 99 and bag 88 out of the shell or housing 42 and affords an entrance into the interior of the drum 45. Sufficient slack is provided in the hose 91 to permit the said outward swing of the bag 88.

The clothes to be washed are then loaded in the drum 45 and pushed back as required. Sufficient soap and any other cleaning material may be supplied at this time, or after water has been added. The door 102 is then closed and the latches 101 operated through the supplementary door to seal the drum 45. Sufficient water is then admitted into the shell 42 and drum 45 through the valve 43.

Electric motor 46 is then operated at a slow or washing speed well understood in the art and the clothes are caused to tumble in the drum 45 so that washing thereof is effected, the ribs 54a serving as agitators or elevators of the clothes during the washing action.

At the conclusion of the washing operation, the dirty wash water is permitted to drain off through dump valve 44 and one or more rinsing operations may follow either at the washing speed or at a higher speed to be described hereinafter.

Thereafter, valve 55 is operated to bring fluid pressure to bear against piston 59 through port 58. Disk 54 will then be forced inwardly and will pile up the clothes as it is doing so, as illustrated in Fig. 9. During this movement of the disk 54, electric motor 46 is switched, or brought by a rheostat, not shown, into high speed so as to rotate drum 45 at a speed sufficient to apply enough centrifugal force to the washed clothes to throw them outwardly against the inner wall of the drum 45. This causes the clothes to assume an annular form as illustrated in Fig. 4, the speed of rotation necessary to create the annulus of clothes being well known to the art. Due to these actions, the disk 54 is brought to a position in the drum 45 where it is caused to embrace the mass of clothes as illustrated in Fig. 4 although the pressure against the piston 59 is insufficient to effect an appreciable squeezing action against the clothes. It will be observed that the shape of the teeth 67 and those of the detent 69 are such as to offer no resistance to the inward movement of the disk 54.

At this time hydraulic valve 89 is operated to introduce fluid under pressure into the inflatable bags 84, 87 and 88. The central opening of the annularly shaped mass of clothes admits the bag 88 therein. Bags 84, 87 then succeed in exerting extremely high pressures against the clothes, in cooperation with bag 88, on three sides of the mass so that the expressed water flows through the perforations of the drum 45 aided therein by the centrifugal force acting upon the expressed water. The concentration of the clothes into annular form by the action above described permits the localization of the expressing forces as illustrated and provides a most effective squeezing action. Any retracting movement of the disk 54 in response to the high fluid pressure exerted on the clothes will be prevented by the toothed detents 69 and 79 which are maintained in engagement with the disk teeth by the springs 74 and 81.

It is apparent that the squeezing action will necessarily effect a reduction in the volume of the mass of clothes. It is highly desirable to have the disk 54 take up the slack bodily rather than require further extension of the inflatable elements. Accordingly, the operator may periodically, during the squeezing operation, actuate valve handle 90 of valve 89 so as to relax the fluid pressure in the inflated bags. This will permit the disk 54 to move forward bodily in response to the pressure exerted against the piston 59, the exhaust fluid from hose 91 being directed into conduit 89b. Thus, during the progress of the squeezing operations, the disk 54, may move forward each time the operator relaxes the squeezing pressure, it being feasible to do so a number of times before the clothes reach a desired degree of dryness. This expedient enables the disk 54 to follow up the mass of clothes as it is squeezed, providing thereby not only a more satisfactory squeezing action but avoiding excessive inflation and strain on the fluid operated bags. The plate 85b serves to absorb the axial pressure of the bag 88 by means of its springs 85c so that the squeezing pressure of bag 84 is not neutralized. The function of the bag 88 is to provide an inner peripheral pressure against the mass of clothes so as to permit squeezing action against three sides of the annularly shaped mass. However, it is apparent that the bag 88 may be eliminated, if desired, from the apparatus described without affecting the application of opposing forces on the washed mass. Under these circumstances, the plate 85a will be likewise dispensable. If it is desired to retain the function of bag 88, an alternative connection thereof may be effected whereby it is secured to the plate 85 and fluid operated from that end so that pressure forces on the mass will not be affected by its operation.

At the completion of the squeezing operation, it is necessary to retract the disk 54 so as to prepare the apparatus for the next load of clothes. Valve 89 is first operated to relax the fluid pressure on the squeezing bags. Valve handle 55a of valve 55 is then thrown to the position of Fig. 4 so as to shunt the fluid under pressure to the inner side of piston 59. This will tend to drive the piston 59 outwardly so as to retract the disk 54. Simultaneously with the actuation of valve 55, an appropriate switch is operated in order to energize solenoid 76 and its opposing solenoid in order to expel rollers 77 and 82 so as to depress rings 75 and 80 and release the detents 69 and 79. In the event that the rollers 77 and 82 are in such relation to rings 75 and 80 that a satisfactory depressing action is not achieved, the drum 45 may be rotated slightly in order to effect the necessary action. It is possible, however, to retract the disk 54 while the drum 45 is rotating so that the disk 54 will be retracted in short spurts as the rollers take effect.

The detents 69 and 79 having been released, the disk 54 will recede to its inoperative position in response to the fluid pressure on the piston 59.

It will be understood that the representation of valve 55 in Fig. 4 is more or less schematic and that conventional means are provided for dissipating the exhaust pressure fluid in the forepart of hydraulic cylinder 56 as the piston 59 is actuated so as to retract the disk 54. The fluid may be either disposed of as waste or returned to a storage supply as those skilled in the art will recognize.

The squeezed clothes may be removed from the drum 45 at the end of the squeezing operation either before or after the retraction of the disk 54.

I have shown a preferred embodiment of my invention but it is obvious that numerous changes and omissions may be made therefrom without departing from its spirit. For example, while I have described the fluid pressure in the second embodiment as originating from a common source, it may be applied independently at both ends of the drum 45. With such construction, the coiled slack of hose 91 and the shelf therefor may be dispensed with. In addition, the inflatable bags may be formed with pleats or corrugations to allow expansion without undue stretching and strain of the material.

*Generally speaking, my invention as herein disclosed, encompasses the novel idea of tumbling a batch of wet clothes while mechanically compacting the same into a confined space of substantially reduced volume, thereby to remove a substantial proportion of wash water from the same, and thereafter while the squeezed clothes are held confined in said space, expanding a fluid-pressurized bag or wall against the same, further to compact the batch at substantially higher pressure to extract additional wash water therefrom. This is made possible, for example, by provision of releasable means for locking disk or piston 54 against retraction, as best shown in Fig. 4, to permit application of higher squeezing pressure to the confined clothes by inflation of inflatable pressure means, such as the bag 88 and/or bag 87, both of which are backed and supported by the front wall of the rotatable drum 45.*

I claim:

1. In a washing and drying apparatus including a washing drum having perforations formed therein, means to express wash water from a mass of washed articles in said washing drum, said means comprising a pair of fluid operated members laterally enclosing said mass of washed articles, first pressure means for bodily advancing one of said fluid operated members within the drum and toward the other member so as to embrace said mass and second pressure means operative after said mass has been embraced by the action of said first pressure means, said second pressure means operated to apply fluid under pressure to at least one of said fluid operated members, said fluid under pressure exerting a considerably higher force than said first pressure means so as to express the wash water from said mass.

2. In a washing and drying apparatus including a drum having perforations formed therein, means to express wash water from a mass of washed articles in said drum, said means comprising a pair of fluid operated members of flexible material laterally enclosing said mass of washed articles, first pressure means for bodily advancing one of said fluid operated members within the drum and toward the other member so as to embrace said mass, second pressure means operative after said mass has been embraced by the action of said first pressure means, said second pressure means operating to apply fluid under pressure to said fluid operated members so as to cause said members to exert a corresponding fluid pressure against said mass, said second pressure means exerting a considerably higher pressure than said first pressure means for expressing the wash water from said mass and means to cause said first pressure means to resume its said embracing action during periods after said second pressure means has commenced operation so as to compensate for the reduced volume of said mass due to the action of said second pressure means during the progress of said expressing operations.

3. In a laundry apparatus including a drum having wash water discharge means formed therein, means to express wash water from a mass of washed articles in said drum, said means comprising a fluid-inflatable pressure member arranged for axial movement in said drum during a normally uninflated condition thereof, first pressure means for causing said pressure member to travel bodily within said drum and toward said mass, independent second pressure means acting upon said mass through said pressure member to squeeze the water from said mass, said second pressure means being a hydraulic pressure so as to inflate the pressure member and being operative against said mass after said first pressure means has reached said mass after traveling thereto whereby the water is squeezed from said mass by hydraulic squeezing operations and means to permit intermittent continued travel of said pressure member by the action of said first pressure means after said hydraulic pressure has been exerted against said mass whereby the decreased volume of said mass due to said hydraulic squeezing operations is compensated for by continued forward travel bodily of said pressure member within said drum.

4. In a cleaning machine having a rotatable cylinder and fixed end walls therefor, apparatus to express wash water from a mass of wet clothes in said cylinder, said apparatus comprising an inflatable pressure bag, said pressure bag being movable bodily axially from one end wall toward the other, and means to inflate said pressure bag when it has traveled to said mass of wet clothes whereby the inflation pressure is applied against said wet clothes so as to express the wash water therefrom.

5. In a cleaning machine having a rotatable cylinder and fixed end walls therefor, apparatus to express wash water from a mass of wet clothes in said cylinder, said apparatus comprising an inflatable pressure bag, said pressure bag being movable bodily axially from one end toward the other, means to inflate said pressure bag when it has traveled to said mass of wet clothes whereby the inflation pressure is applied against said wet clothes so as to express the wash water therefrom, and means to cause said pressure bag to re-assume its axial travel bodily in the direction of said mass after the expression of wash water therefrom so as to compensate for the reduced volume of said mass during the progress of said expressing operations.

6. In a washing and drying apparatus including a drum having perforations formed therein, means to express wash water from a mass of washed articles in said drum, said means comprising an inflatable pressure member arranged for axial movement in said drum, first pressure means for causing said pressure member to travel bodily within said drum toward said mass during a normally uninflated condition of said pressure member and second pressure means acting upon said mass by the inflation of said pressure member to squeeze the water from said mass.

7. In a washing and drying apparatus including a drum having perforations formed therein, means to express wash water from a mass of washed articles in said drum, said means comprising an inflatable pressure member arranged for axial movement within said drum, first pressure means for causing said pressure member to travel forward bodily within said drum during a normally uninflated condition thereof and toward said mass so as to axially compress said mass during said travel, second pressure means operative to extend said pressure member after it has compressed said mass before it so as to exert a high pressure against said mass, and means to maintain said pressure member against rearward movement bodily while said second pressure means is operating.

8. An apparatus according to claim 7 and wherein said second pressure means is a fluid under pressure operative to inflate said pressure member.

9. In a washing and drying apparatus including a drum having perforations formed therein, means to express wash water from a mass of washed articles in said drum, said means comprising an inflatable pressure member arranged for axial movement in said drum in a normally uninflated condition of said pressure member, first pressure means for causing said pressure member to travel forward bodily within said drum during its said normally uninflated condition and toward said mass so as to axially compress said mass before it during said travel, fluid pressure means operative to inflate said pressure member after it has compressed said mass before it so as to exert a high pressure against said mass, means to maintain said pressure member against rearward movement bodily while said fluid pressure means is operating and means to permit intermittent advance of said pressure member after said high pressure has been exerted against said mass whereby the decreased volume of said mass due to said squeezing operations is compensated for by continued forward travel bodily of said pressure member.

10. An apparatus according to claim 9 including a second fluid pressure means acting against said mass in opposition to said first mentioned fluid pressure means.

11. In a cleaning machine having a rotatable cylinder, apparatus to express wash water from a mass of wet clothes in said cylinder, said apparatus comprising an inflatable compression bag axially movable bodily in said cylinder so as to pile up said clothes during said movement, means to rotate said cylinder during said movement so as to urge said clothes into radial form in respect to the axis of the cylinder, and means to inflate said compression bag so as to apply high pressure against the radially formed mass of clothes for expressing the wash water therefrom.

*12. A machine for fluid-extracting clothes or like articles, comprising an article-containing drum, a plunger axially shiftable in the drum, power means for axially shifting said plunger from a retracted position toward a fixed position at one end of the drum to compress articles in a confined space of substantially reduced volume at said one end, locking means for fixing said plunger against retraction from said fixed position, a fluid-containing member having a fluid-expandable flexible wall portion mounted to be backed and supported at said one end of the drum, and means for applying fluid-pressure within said member to expand said wall portion against the articles in said confined space further to compress the articles.*

*13. A machine for washing and fluid-extracting clothes or like articles, comprising a support, a drum mounted on said support to rotate about an axis, a plunger axially shiftable within said drum, power means for axially shifting said plunger from a retracted position toward a fixed position at one end of the drum to compress articles in a confined space of substantially reduced volume at said one end, means for retaining said plunger in said fixed position, a fluid expandable flexible diaphragm mounted at said one end of the drum, and means for applying fluid-pressure within said diaphragm further to compress the confined articles.*

*14. A machine for washing and fluid-extracting clothes or like articles, comprising a support, a drum mounted on said support to rotate about an axis, means for rotating said drum, a plunger axially shiftable in the drum, power means for axially shifting said plunger from a retracted position toward a fixed position at one end of the drum, a backing wall at said one end of the drum having a fluid-pressure expandable wall portion thereon, means for locking said plunger against retraction in said fixed position, and fluid-pressure means for expanding said wall portion toward said fixed plunger.*

*15. A machine for washing and fluid-extracting clothes or like articles, comprising a drum support, a drum mounted on said support to be rotatable about a substantially horizontally axis and having a forward open end, power-operated means for rotating said drum, a plunger mounted to be axially shiftable in said drum, power means for axially shifting said plunger from a retracted position toward fixed position at the forward end of the drum locking means for retaining said plunger in said fixed position, a closure at said open end of the drum including releasable locking means for locking the same in closed position on the drum to rotate therewith, a closure support rotatably supporting said closure to be movable from and toward said closed position, a fluid-containing member mounted on said closure presenting a fluid-expandable*

*diaphragm inwardly of the drum, and means for applying fluid-pressure in said fluid-containing member to expand said diaphragm toward said plunger in the locked position thereof.*

References Cited in the file of this patent or the original patent

UNITED STATES PATENTS

| | | |
|---|---|---|
| 545,747 | Sunderland | Sept. 3, 1895 |
| 597,716 | Hwass | Jan. 25, 1898 |
| 1,531,922 | Graham | Mar. 31, 1925 |
| 1,547,266 | Robe | July 28, 1925 |
| 2,157,395 | Benson | May 9, 1939 |
| 2,178,385 | Alward | Oct. 31, 1939 |
| 2,230,533 | Eckler | Feb. 4, 1941 |